(12) United States Patent
Wasserman et al.

(10) Patent No.: US 10,612,758 B2
(45) Date of Patent: Apr. 7, 2020

(54) LINEAR LED LIGHTING WITH ON-BOARD LIGHT GUIDES

(71) Applicant: Elemental LED, Inc., Reno, NV (US)

(72) Inventors: Aaron Wasserman, Oakland, CA (US); Russell Petersen, Alameda, CA (US); Steven W. Gensler, San Jose, CA (US)

(73) Assignee: Elemental LED, Inc., Reno, NV (US)

( * ) Notice: Subject to any disclaimer, the term of this patent is extended or adjusted under 35 U.S.C. 154(b) by 0 days.

(21) Appl. No.: 16/103,732

(22) Filed: Aug. 14, 2018

(65) Prior Publication Data

US 2018/0348426 A1    Dec. 6, 2018

Related U.S. Application Data

(63) Continuation of application No. 15/493,905, filed on Apr. 21, 2017, now Pat. No. 10,078,180.

(51) Int. Cl.

| | |
|---|---|
| *F21V 7/04* | (2006.01) |
| *F21V 23/00* | (2015.01) |
| *F21S 4/28* | (2016.01) |
| *F21V 8/00* | (2006.01) |
| *F21K 9/61* | (2016.01) |
| *F21Y 115/10* | (2016.01) |
| *F21Y 103/10* | (2016.01) |
| *F21V 3/02* | (2006.01) |
| *F21K 9/66* | (2016.01) |

(52) U.S. Cl.
CPC .............. *F21V 23/005* (2013.01); *F21K 9/61* (2016.08); *F21S 4/28* (2016.01); *G02B 6/0045* (2013.01); *G02B 6/0073* (2013.01); *G02B 6/0081* (2013.01); *G02B 6/0088* (2013.01); *G02B 6/0095* (2013.01); *F21K 9/66* (2016.08); *F21V 3/02* (2013.01); *F21Y 2103/10* (2016.08); *F21Y 2115/10* (2016.08)

(58) Field of Classification Search
CPC .. G02B 6/0896; G02B 6/0045; G02B 6/0073; G02B 6/0081; G02B 6/0095; G02B 6/0088; F21K 9/61; F21S 4/28; F21V 23/005
USPC ......................................................... 362/555
See application file for complete search history.

(56) References Cited

U.S. PATENT DOCUMENTS

| | | | |
|---|---|---|---|
| 2,443,561 A | | 6/1948 | Greenwald |
| 9,583,903 B1 * | | 2/2017 | Buck .................... H01R 13/512 |
| 9,620,889 B1 | | 4/2017 | Buck et al. |

(Continued)

OTHER PUBLICATIONS

Dow Corning, "Moldable Silicones for Secondary Optics Applications." Internet. Available at https://www.dowcorning.com/content/publishedlit/11-3371.pdf, version of Dec. 2016.

*Primary Examiner* — Ali Alavi
(74) *Attorney, Agent, or Firm* — United IP Counselors, LLC

(57) ABSTRACT

Linear lighting using light-emitting diode (LED) light engines is disclosed. The linear lighting includes a printed circuit board (PCB) with a number of LED light engines disposed on it. A light guide is disposed on the PCB adjacent to the LED light engines. The light guide accepts the light from the LED light engines in a first location and is arranged to emit the light at a desired position that is spaced from the first location. By lengthening the optical path, the light guide may spread the emitted light and provide a more uniform appearance for the linear lighting.

13 Claims, 7 Drawing Sheets

(56) References Cited

U.S. PATENT DOCUMENTS

| | | | |
|---|---|---|---|
| 9,647,349 B1* | 5/2017 | Stillman | F21V 23/06 |
| 9,784,421 B1* | 10/2017 | Petersen | F21S 4/22 |
| 10,078,180 B1* | 9/2018 | Wasserman | F21S 4/28 |
| 2010/0315811 A1* | 12/2010 | Chen | F21V 13/04 |
| | | | 362/235 |
| 2012/0001538 A1* | 1/2012 | Kim | H01L 25/0753 |
| | | | 313/512 |
| 2015/0323142 A1* | 11/2015 | Shigematsu | F21K 9/61 |
| | | | 362/235 |

* cited by examiner

US 10,612,758 B2

LINEAR LED LIGHTING WITH ON-BOARD LIGHT GUIDES

CROSS-REFERENCE TO RELATED APPLICATIONS

This application is a continuation of U.S. patent application Ser. No. 15/493,905, filed Apr. 21, 2017. The contents of that application are incorporated by reference herein.

BACKGROUND OF THE INVENTION

1. Field of the Invention

Generally speaking, the invention relates to linear LED lighting, and more particularly, to linear LED lighting with on-board light guides.

2. Description of Related Art

Over the last decade, lighting based on light-emitting diodes (LEDs) has become dominant in the lighting industry, and is widely used in both residential and commercial installations. LED-based lighting has a number of advantages compared with legacy incandescent and fluorescent lighting, including high efficiency and low power draw, relatively low operating temperatures, and, with some models, selectable color and controllable color temperature.

For most commercial and residential applications, two major types of LED-based lighting are used: bulb-type lamps and linear lighting. Bulb-type lamps are intended as direct replacements for incandescent light bulbs, typically have a shape similar to the type of bulb they are intended to replace, have a traditional socket to connect to a fixture and draw power, and are usually constructed to produce roughly the same light output as the bulbs they are intended to replace. Linear lighting is somewhat different—it usually includes a number of LEDs arranged at a regular spacing or pitch along a printed circuit board (PCB). That PCB may be rigid, made, for example, of FR4 composite, or it may be flexible, made, for example, of Mylar. In either case, the PCB usually has the form of a thin strip, although other shapes and sizes are possible. The amount of light produced by a strip of linear lighting depends on the properties of each LED, the pitch of the LEDs, and the total length of the strip, and is usually expressed in units of light intensity per unit length.

One of the major advantages of linear lighting is its versatility. Alone, it can serve as accent lighting or task lighting, often in locations where it would be difficult to install traditional lighting fixtures. Placed in an appropriate extrusion and covered with a diffuser, it can serve as primary room lighting, replacing legacy fluorescent fixtures in offices. Properly electrically insulated and encapsulated, it can be used even in outdoor and wet locations.

Despite myriad advantages, linear lighting does have some drawbacks. For example, unmodified, the light from a strip of linear lighting appears as a number of discrete points of light. This is acceptable for many applications, but not all. The usual solution is to place the lighting in an extrusion and cover it with a diffuser, which, again, is acceptable for many applications, but not all.

SUMMARY OF THE INVENTION

One aspect of the invention relates to linear lighting. The linear lighting comprises a printed circuit board (PCB) with a plurality of LED light engines disposed on it and a light guide. The LED light engines are electrically connected to the PCB, are spaced along it at a regular pitch, and are arranged to emit light in a first direction. The light guide receives light emitted by the plurality of LED light engines at a first position and emits that light in a desired position spaced from the first position.

In various embodiments, the light guide may have different forms. For example, the light guide may have the form of a hollow, split tube that "straddles" the LED light engines on the PCB and accepts the light emitted by them at its ends. The LED light engines may be side-emitting, such that they emit light directly into one or both ends of the light guide. The light guide itself may be "interrupted" or provided with surface deformations, inclusions, or other features that selectively reduce or eliminate total internal reflection at the desired position and thereby cause the light guide to emit light at the desired position.

In other cases, the light guide may be a partial light guide—it may accept light from the LED light engines at one or both of its ends and have an index of refraction and curvature that allow the light to be directed or conducted in a particular direction and released in that direction.

In yet other cases, two pluralities or series of LED light engines may be laterally spaced from one another and arranged to emit light inwardly, toward a horizontal centerline of the PCB. A light guide, in the form of a prism, sits between the two series of LED light engines and redirects the light upwardly.

In other aspects of the invention, the linear lighting may be fully enclosed by a covering, and the light guide may cooperate with or be an integral part of the covering.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the figures, and in which.

DETAILED DESCRIPTION

Figure 1:
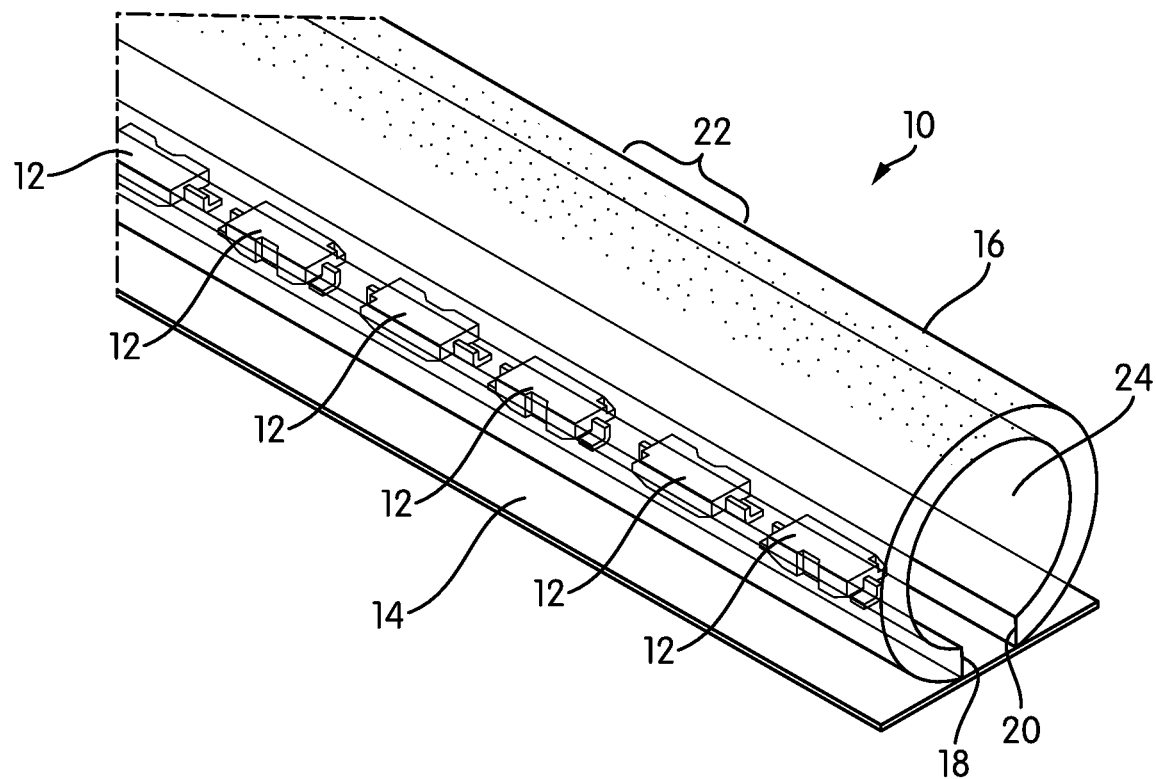
FIG. 1 is a perspective view of a strip of linear LED lighting with a light guide, according to one embodiment of the invention.

FIG. 1 is a perspective view of a strip of linear lighting with a light guide, generally indicated at 10, according to one embodiment of the invention. Generally speaking, the linear lighting 10 comprises a number of light-emitting diode (LED) light engines 12 arranged at a regular pitch or spacing along a printed circuit board (PCB) 14. In this particular embodiment, the LED light engines 12 are side emitting, which means that instead of sending light upward, they emit light either to the left side or to the right side (using the coordinate system of FIG. 1). A light guide 16, which in the illustrated embodiment has the rounded form of a hollow split-tube extrusion, receives the light emitted by the LED light engines 12.

The LED light engines 12 typically comprise one or more LEDs packaged with a phosphor. The individual LEDs may be, for example, blue- or ultraviolet-emitting LEDs. Their light is received by the phosphor, excites the phosphor, and re-emitted, usually as white light. While this arrangement is typical for LED light engines 12 that emit white light, embodiments of the invention may use any type of LED light engine, including red-green-blue (RGB) light engines that mix red, green, and blue LEDs to produce a wide array of colors, and so-called "dim-to-warm" LED light engines that change apparent color temperature (by changing RGB mix) as they are dimmed.

The PCB 14 itself may be either rigid or flexible. A flexible PCB 14 may, for example, use Mylar as a basic substrate, while a rigid PCB 14 may use a material such as FR4 glass-fiber composite. (Many other materials suitable for PCBs are known, and any such materials may be used in embodiments of the invention.) The PCB 14 may include circuit elements in addition to the LED light engines 12, including current controllers and current control resistors. U.S. application Ser. No. 15/409,101, filed Jan. 18, 2017, the contents of which are incorporated by reference in their entirety, discloses a high-voltage LED strip light that has power conversion circuits on its PCB, and those kinds of circuit elements may be used if the linear lighting 10 is high-voltage. Components on the PCB 14 may be surface mounted or mounted in any other conventional fashion.

Generally speaking, a light guide is an element that conducts light from one place to another along a defined path. Light guides have a refractive index greater than that of the surrounding environment (i.e., in this case, greater than air, if the linear lighting 10 is to be used in air, or greater than water, if the linear lighting 10 is to be used fully submerged), and rely on total internal reflection of light rays to keep them within the guide. The most well known of light guides is probably the optical fiber, which includes a core with a high refractive index and cladding of a lower refractive index, although some optical fibers have a refractive index that varies in a continuous gradient from the center toward the edges.

Figure 2:
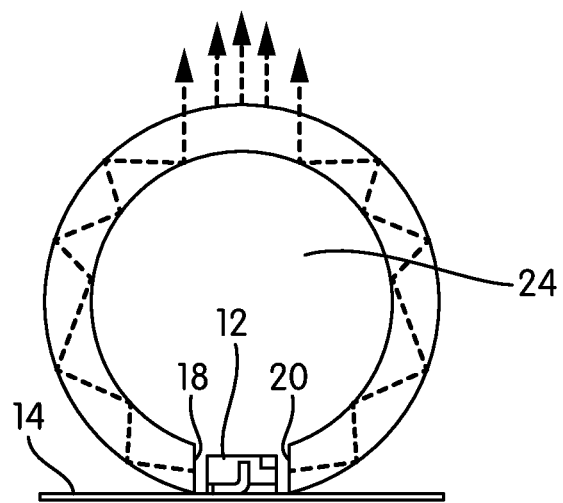
FIG. 2 is an end elevational view of the linear LED lighting of FIG. 1.

FIG. 2 is an end-elevational view of the linear lighting 10. As can be seen in FIGS. 1 and 2, the light guide 16 of the illustrated embodiment has the form of a cut cylinder, and is an extrusion of constant cross-section. The light guide 16 is placed over the LED light engines 12 and has a cut-out sized such that its ends 18, 20 are immediately adjacent to the light engines 12, in this case, immediately to the left and right of the light engines 12. Since the light engines 12 of the illustrated embodiment are side emitting, the light engines 12 emit laterally, directly into the edges 18, 20 of the light guide 16, and the light rays thus enter the light guide 16. From their entry point, the light rays travel around the light guide 16, with total internal reflection largely keeping them within the guide 16.

Depending on the embodiment, light may enter the light guide 16 from one edge 18, 20 or it may enter from both edges 18, 20. In other words, in some embodiments, all of the LED light engines 12 may face the same way and emit light in the same direction. That may be a desirable look or effect in some applications. However, the light may be better distributed if some of the LED light engines 12 emit into one edge 18 and some LED light engines 12 emit into the other edge 20 of the light guide 16. Thus, in the illustrated embodiment, the LED light engines 12 alternate their orientations in A-B-A-B fashion, facing left, then right, then left again. In other embodiments, completely random orientations of LED light engines 12 are possible, with any particular light engine 12 randomly facing one edge 18, 20 or the other.

An ideal light guide, like an optical fiber, would simply convey the light from one end to the other, with little or no light leakage in between the two ends. However, the linear lighting 10 would be of little use if substantially all of the light emitted by the LED light engines 12 remained in the light guide 16. Therefore, the light guide 16 may be selectively modified to reduce or eliminate total internal reflection over certain selected portions, so as to emit light where desired. Because some portion of the light guide 16 is typically modified to allow light to escape, portions of this description may refer to the light guide 16 as being an "interrupted" light guide.

Selective modification to allow light emission can be done in any number of different ways. In FIG. 1, a series of micro-deformations 22 on the outer, upper surface of the light guide 16 alter the interface between the surrounding environment and the material of the light guide 16, prevent total internal reflection, and allow light to escape the guide 16. Those micro-deformations 22 may be small gouges, grooves, scratches, or anything else that perturbs the interface between the light guide 16 and the surrounding medium.

In other embodiments, a portion of the light guide 16 may have at least superficial particulate inclusions that scatter the rays of light and allow them to escape the light guide 16. U.S. application Ser. No. 15/444,206, filed Feb. 27, 2017, the contents of which are incorporated by reference in their entirety, teaches coverings for LED linear lighting, and discloses a number of particulate materials that can be added to scatter light. The '206 application also teaches methods for making patterns of deformations or abrasions in such coverings, and those methods may be used on the light guide 16.

The light guide 16 lengthens the optical path through which the light from the LED light engines travels before it is emitted. By increasing the path length and emitting only indirect light, the light guide 16 may potentially present a more uniform, distributed light than linear lighting without a light guide. In other words, the pattern of discrete light spots seen in typical linear lighting may be reduced.

Notably, while an interrupted light guide like the light guide 16 may distribute light over a broader area and create some of the same light-appearance characteristics as a diffuser, the light guide 16 operates differently than a diffuser. (In contrast to the light guide 16, a diffuser simply scatters light that passes through it.) The light guide 16 also performs its function very close to the LED light engines 12, which may reduce the need for a diffuser, or other optical modifiers, farther away. The light guide 16 may also be specifically adapted to cooperate with other optical modifiers, like diffusers that may be placed over it.

In some embodiments, the LED light engines 12 may be physically coupled to the ends 18, 20 of the light guide 16, for example, by optical adhesives with a similar optical density and refractive index to those of the light guide 16, in order to avoid light leakage and other effects of transitioning from air into the light guide 16. Such adhesives might also help to secure the light guide 16 on the PCB 14. However, in many embodiments, coupling may not be necessary, so long as the ends 18, 20 of the light guide 16 are immediately adjacent the light engines 12. In other words, in many embodiments, some small loss of light may be tolerated.

The light guide 16 may be made using a variety of materials, depending on the nature of the linear lighting 10. The material of which the light guide 16 is made is preferably transparent and has a higher index of refraction than the surroundings. For example if the PCB 14 is rigid, the light guide 16 may be made of a rigid material, such as glass or rigid poly(methyl methacrylate) (PMMA; PLEXIGLAS®). If the PCB 14 is flexible, the light guide 16 would generally also be made of a flexible material, such as a flexible, transparent poly(vinyl chloride) (PVC), polyurethane, or polymeric silicone material.

While there is no absolute lower bound to the refractive index of the material from which the light guide 16 is made, it is helpful if the difference between the refractive index of the material and the refractive index of air (or water, if water is to be the surrounding medium) is as great as possible. In practical terms, with air as the surrounding medium, a material with a refractive index of at least about 1.3 is helpful, and materials with refractive indexes of 1.4-1.5 or greater may be commonly used—typical soft window glass, PMMA, and PVC all have refractive indexes around, or greater than, 1.5.

As those of skill in the art will appreciate, the shape of the light guide 16 and its material are chosen such that the angles of incidence of the light rays as they travel through the light guide 16 are greater than the critical angle for the interface between the light guide 16 and its surroundings, and the light rays are thus totally internally reflected. The rounded shape of the light guide 16 assists in this. (For most materials with a refractive index of 1.4-1.5 in air, the critical angle is in the range of about 40-45°.)

The hollow, split-tubular shape of the light guide 16 leaves an interior open space 24. In some cases, this space may be filled with a material. Particularly if the linear lighting 10 is flexible, a filling material may prevent the light guide 16 from deforming so much when the linear lighting 10 is flexed that total internal reflection is lost. The filling material may be opaque, in which case it may also be either white or reflective, or it may be transparent, in which case it may have a lower refractive index than the material of the light guide 16 and act as a sort of interior cladding. The filling material, if any, may also cause the light guide 16 to adhere to the PCB 14. In addition or as an alternative to filling, the surfaces of the light guide 16 may be coated in some embodiments to increase internal reflectance.

As those of skill in the art will appreciate, the linear lighting 10 of FIGS. 1 and 2 has a bare PCB 14—it is not covered or electrically insulated, except for whatever insulating or passivating layers are on the PCB 14 to protect individual circuit traces. This would typically be the case with low-voltage linear lighting. While the definitions of "low voltage" and "high voltage" depend on the authority one consults, for purposes of this description, voltages over about 50V will be considered to be high voltage.

U.S. Pat. No. 9,583,903, the contents of which are incorporated by reference in their entirety, discloses high-voltage linear lighting. In this type of linear lighting, the PCB is encapsulated entirely by a clear covering, made of a material like PVC. High-voltage power and ground conductors run the entire length of the linear lighting in separate pockets within the covering to supply power.

Figure 3:
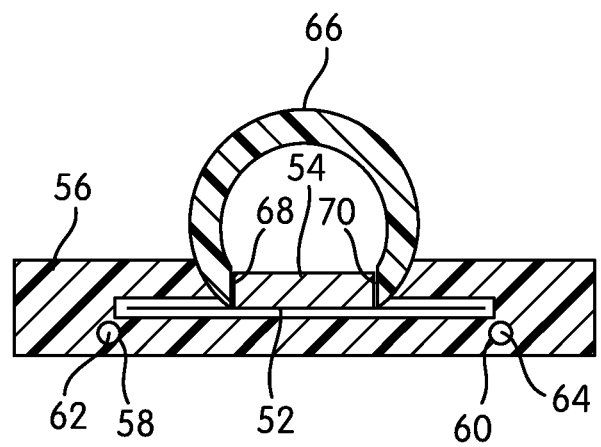
FIG. 3 is a cross-sectional view of a strip of fully-encapsulated, high-voltage linear LED lighting with a light guide.

FIG. 3 is a cross-sectional view of high-voltage linear lighting, generally indicated at 50, according to another embodiment of the invention. The linear lighting 50 has a PCB 52. Mounted on the PCB 52 are a plurality of LED light engines 54. The PCB 52 is fully encapsulated by a covering 56, which may be made of a material like PVC. The covering 56 defines two separate compartments 58, 60 that carry respective power and ground leads 62, 64 that traverse the length of the PCB 52. The electrical arrangement of the PCB 52 and light engines 54 may be as described in U.S. patent application Ser. No. 15/409,101, which was incorporated by reference above. Briefly, the '101 application describes a PCB layout in which the PCB is divided into a number of repeating blocks, which are electrically connected in parallel with one another. Each of the repeating blocks is connected to the power and ground leads 62, 64, and each block carries its own power conversion and conditioning circuitry, in addition to several LED light engines 54.

A light guide 66 emerges from the covering 56 and has the rounded shape of the light guide 16. The ends 68, 70 of the guide 66 are immediately adjacent to the LED light engines 54 which, like those of the linear lighting 10 described above, are side-emitting. The guide 66 in this embodiment is an integral part of the covering 56, such that the linear lighting 50 is completely electrically insulated.

Although they are integral, the material of which the covering 56 is made may differ from the material of which the light guide 66 is made. The covering 56 may be of a different material than the light guide 66, for example, a material of a lower index of refraction. If the two elements 56, 66 are made of the same material, the material of the covering 56 may have a lower index of refraction, or the covering 56 may be made of an opaque, material, for example, a plastic with white or reflective colorant added. There may also be a small air gap between the covering 56 and the light guide 66, in order to prevent light leakage from the light guide 66 into the covering 56. The covering 56 and the light guide 66 may be co-extruded, or the light guide 66 may be extruded over the covering 56 in a separate step.

The interrupted light guides 16, 66 are advantageous in that their rounded shape provides for better control of the light, and selective interruption of that shape (or, at least, its light-containing shape) allows for great versatility in where and how the light escapes the light guide 16, 66. However, the level of control offered by the light guides 16, 66 may not be necessary in all embodiments.

Figure 4:
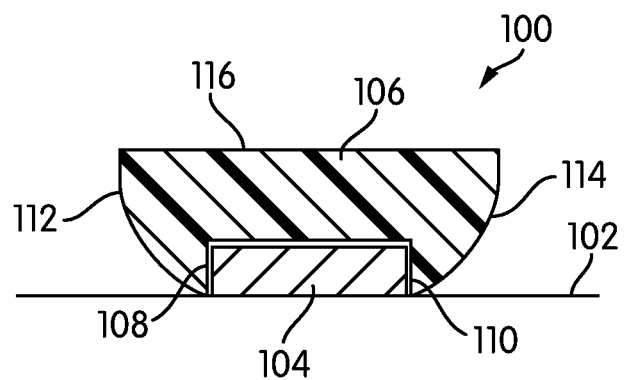
FIG. 4 is a cross-sectional view of a strip of linear LED lighting with a partial light guide.

FIG. 4 is a cross-sectional view of a strip of linear lighting, generally indicated at 100, according to another embodiment of the invention. Mounted on a PCB 102 are a plurality of side-emitting light engines 104, spaced at a regular pitch along the PCB 102. Mounted overtop the light engines 104 is a "partial" light guide 106. The partial light guide 106 "straddles" the light engines 104 and has depending portions with edges 108, 110 that extend vertically, generally parallel to the edges of the light engines 104. Thus, like in the linear lighting 10, 50 described above, the light engines 104 emit light directly into the edges of the partial light guide 106.

However, whereas the light guides 16, 66 described above are entirely (or nearly entirely) rounded, the partial light guide 106 has rounded outer side edges 112, 114, but ends in a flattened upper surface that is essentially parallel to the PCB 102. When light is emitted into the inner edges 108, 110 of the partial light guide 106, total internal reflection at the interface of outer side edges 112, 114 "steers" the majority of the light upward, where it is released. The partial light guide 106 thus performs many of the functions of the interrupted light guides 16, 66 described above: it lengthens the optical path by using internal reflection to redirect light rays. Compared with the other light guides 16, 66, though, the configuration of the partial light guide 106 also recognizes that in many applications, it is desirable for the light to be emitted upward. Therefore, once the majority of the light rays are internally reflected upward at the rounded side edges 112, 114, the partial light guide 106 does not attempt to further contain them with a curved upper surface. In order to attach the partial light guide 106 to the PCB 102, beads of adhesive may be added atop the light engines 104.

Figure 5:
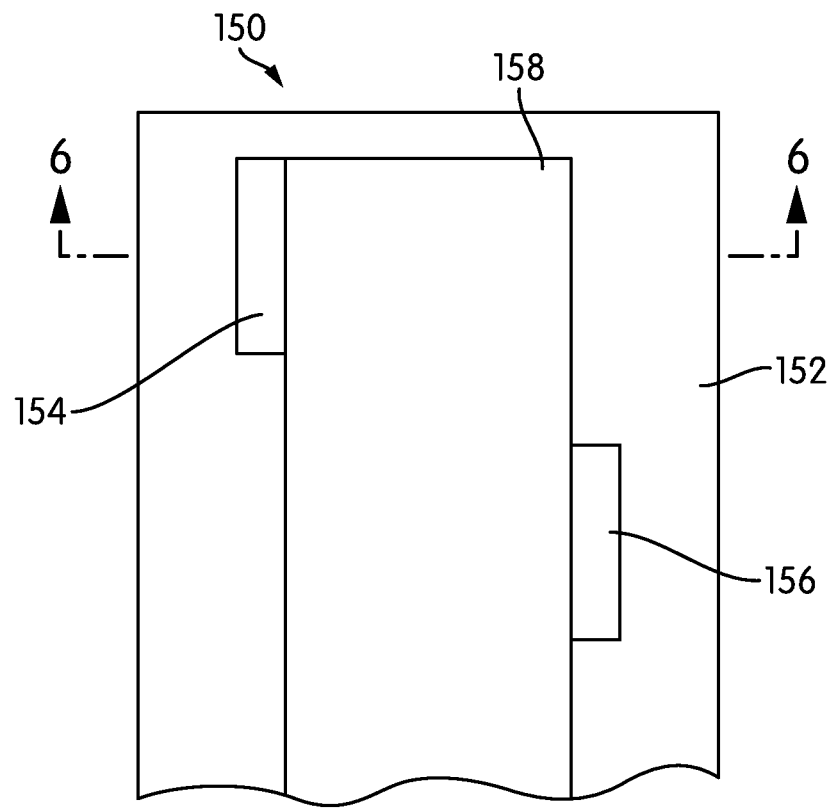
FIG. 5 is a top plan view of a strip of linear LED lighting with inwardly-emitting LED light engines and a prismatic light guide.
Figure 6:
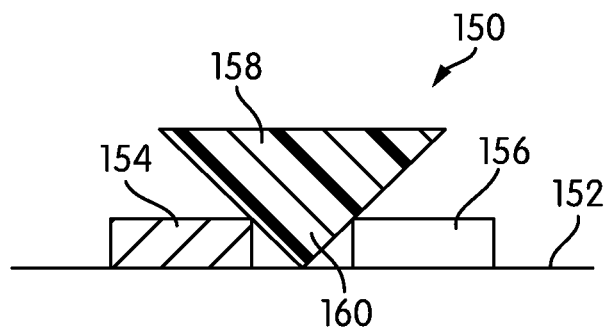
FIG. 6 is a cross-sectional view of a strip of linear LED lighting with inwardly-emitting LED light engines and a prismatic light guide.

In the embodiments described above, the LED light engines are side-emitting and emit outward. Some embodiments may include side-emitting LED light engines that emit inward. FIG. 5 is a top plan view of a strip of linear LED lighting, generally indicated at 150, and FIG. 6 is a cross-sectional view of the linear lighting 150, taken through Line 6-6 of FIG. 5. The linear lighting 150 includes a PCB 152, which, like the other embodiments, may be either flexible or rigid. Mounted on the PCB are a series of LED light engines 154, 156 spaced at a regular pitch and offset somewhat from the longitudinal centerline of the PCB 152.

The light engines 154, 156 are side-emitting, but they are oriented such that they emit toward the centerline of the PCB 152. The light engines 154, 156 are also staggered down the length of the PCB 152, although they may be placed opposite one another in some embodiments. A different type of partial light guide 158—this one having the general form of a triangular prism—sits partially overtop of the light engines 154, 156 and has a central portion 160 that inserts between the light engines 154, 156 such that, as with the other light guides 16, 66, the light engines 154, 156 emit into the light guide 158. The sides of the lower portion 160 of the light guide 158 may be set at or near the critical angle for the material of which the light guide 158 is made.

The light guide 158 may be made of the same kinds of materials described above—PVC, acrylic, silicone, or any other form of transparent resin, depending on whether the PCB 152 is rigid or flexible, and other factors. The form of the light guide 158—a prismatic extrusion—will redirect the light and lengthen the optical path. However, this type of light guide 158 is less likely to contain the light and more likely to release it in a less controlled manner. In some cases, the edge of the light guide 158 opposite an emitting light engine 154, 156 may be made reflective to prevent light leakage in those portions.

Figure 7:
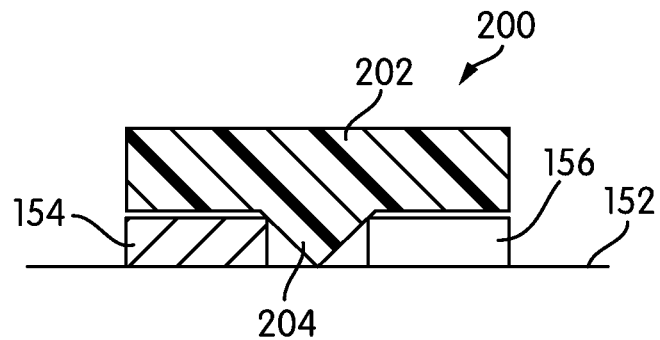
FIG. 7 is a cross-sectional view of a strip of linear LED lighting according to another embodiment of the invention.

Of course, the light guide 158 need not have a fully prismatic shape. FIG. 7 is a cross-sectional view of a strip of linear lighting, generally indicated at 200, that is similar in most respects to the linear lighting 150 described above. The linear lighting 200 has a PCB 152, which may be flexible or rigid, and a series of LED light engines 154, 156, which may be offset from one another and emit light toward the centerline of the PCB 152.

Overtop the LED light engines 154, 156 is a light guide 202. The light guide 202 has a lower portion 204 that inserts between the light engines 154, 156, such that the light engines 154, 156 emit light into it. However, instead of the triangular shape of the light guide 158, the light guide 202 broadens out above the lower portion 204 and extends over the light engines 154, 156, a substantial portion of the width of the PCB 152. Except for the lower portion 204, the shape of the light guide 202 is rectilinear. As with the light guide 158, the sides of the lower portion 204 of the light guide 202 may be set at or near the critical angle for the material of which the light guide 202 is made.

Figure 8:
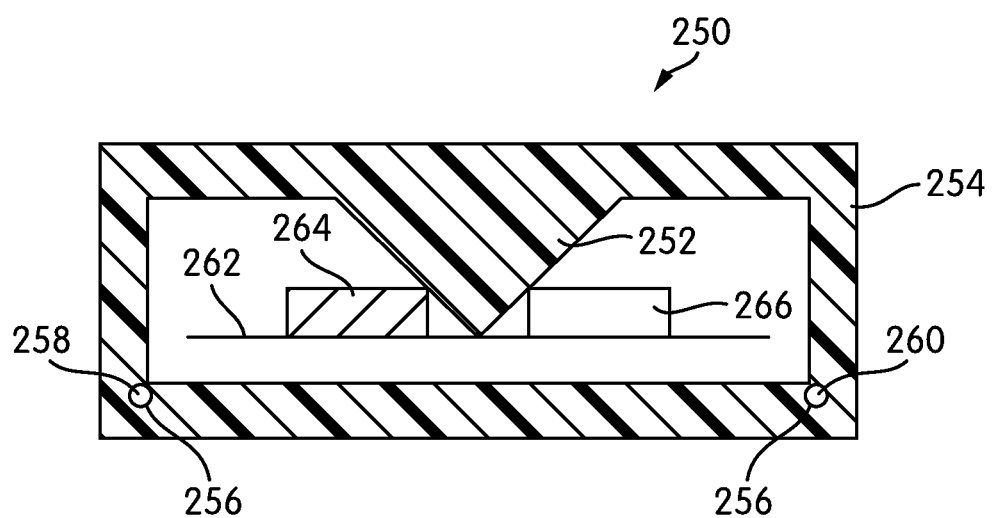
FIG. 8 is a cross-sectional view of a strip of high-voltage linear LED lighting with a prismatic light guide.

FIG. 8 is a cross-sectional view of a strip of linear lighting, generally indicated at 250, with which a prismatic partial light guide 252 is used. The strip of linear lighting 250 may be assumed to operate at high voltage; it is fully encapsulated by a covering 254. The covering 254 has pockets or channels 256 that contain respective power and ground leads 258, 260 that extend the length of the linear lighting 250 and are connected to the PCB 262 of the linear lighting 250 at regular intervals to provide power. As with the other high-voltage embodiment described above, the linear lighting 250 may have the kind of electrical arrangement described in U.S. patent application Ser. No. 15/409,101, which was incorporated by reference above.

The covering 254 electrically insulates the power and ground leads 258, 260 from the other components. The covering 254 may be made of any clear, electrically insulative material, and that material may be either rigid or flexible, depending on whether or not the linear lighting 250 itself is intended to be rigid or flexible. As was described above, suitable flexible materials for the covering 254 include PVC and silicone; suitable rigid materials include PMMA.

Mounted on the PCB 262 are series of LED light engines 264, 266 that are separated from one another and spaced at a regular pitch. Like the LED light engines 154, 156 of FIG. 5-6, the LED light engines 264, 266 are offset to the left and right of the horizontal centerline of the PCB 262 and are staggered along the length of the PCB 262, although in other embodiments, the respective light engines 264, 266 may be placed directly opposite one another. Also like the LED light engines 154, 156 described above, the LED light engines 264, 266 are side-emitting and emit inwardly, toward the centerline of the PCB 262.

In this embodiment, the light guide 252 again has the shape of a triangular prism. As can also be seen in FIG. 8, the light guide 252 is an integral part of the covering 254 and descends from the upper interior surface of the covering 254, extending downwardly and terminating in a lower portion 268 that sits between the light engines 264, 266 such that the emit light into it. As with the light guide 158 of FIG. 5, the outer surfaces of the lower portion 268 of the light guide 252 are angled, and may be given an angle at or close to the critical angle for the material.

With the arrangement shown in FIG. 8, the lower portion 268 of the light guide 252 receives the light rays from the light engines 264, 266 and will tend to refract those rays upwardly. From that point, the light rays are likely to scatter and be emitted as they pass through the upper surface of the covering 254. Thus, the light guide 252 is a partial light guide, like some of the light guides described above: it bends the light rays and lengthens the optical path, but does not necessarily contain the light rays once their direction is changed.

Other embodiments that use a fully covered or encapsulated PCB with a light guide are possible. As was described above, FIG. 3 illustrates an embodiment in which an interrupted tubular light guide 66 is installed on a fully encapsulated PCB 52. However, an interrupted tubular light guide may take slightly different forms in other embodiments.

Figure 9:
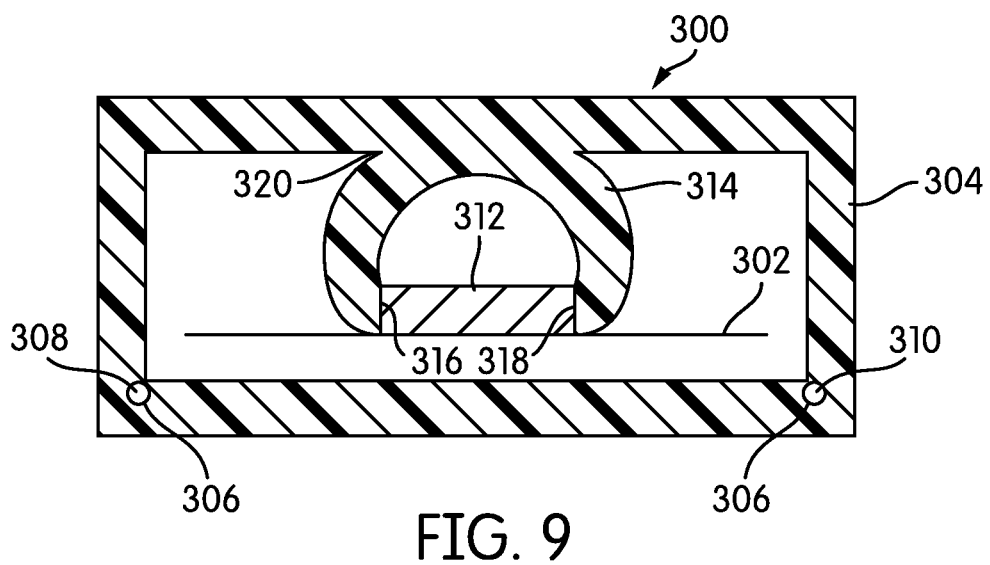
FIG. 9 is a cross-sectional view of a strip of high-voltage linear LED lighting with a cut-tubular light guide according to another embodiment of the invention.

FIG. 9 is a cross-sectional view of another embodiment of a high-voltage strip of linear lighting, generally indicated at 300. In the linear lighting 300, a rigid or flexible PCB 302 is fully encapsulated by a transparent covering 304. As with the previous embodiment, the covering 304 has pockets or channels 306 that carry respective power and ground leads 308, 310 while electrically insulating them from the other components. The power and ground leads 308, 310 make contact with the PCB 302 intermittently to supply power.

A series of light engines 312 are mounted along the PCB 302, spaced at a regular pitch from one another. In the illustrated embodiment, the light engines 312 are all aligned with one another and are mounted at least approximately along the centerline of the PCB 302, although other arrangements are possible. For purposes of this description, it may be assumed that the light engines 312 are side emitting and, like the light engines 12 of FIG. 1, alternate such that some of them emit to the left and others emit to the right, in A-B-A-B fashion, although other patterns and arrangements are possible.

Like the light guide 16 of FIG. 1, a split-tubular light guide 314 is provided within the covering 304 and occupies the space between the inner, uppermost surface of the covering 304 and the PCB 302. The light guide 314 has left and right ends 316, 318 that are positioned so as to be immediately adjacent to the LED light engines 312, such that the light engines 312 emit into the ends 316, 318 of the light guide 314. As in other embodiments, in some cases, the ends 316, 318 may be optically coupled to the LED light engines 312, e.g., by optical adhesives, although that is not necessary in all cases.

The curved, tubular shape of the light guide 314 has essentially the same effect as was described above with respect to the light guide 16 of FIG. 1—it receives the light rays from the light engines 312 and directs those rays of light upwardly, along the curve of the light guide 314. Like the light guide 16 of FIG. 1, the light guide 314 is also interrupted so as to emit the light in a desired location.

As shown in FIG. 9, along its uppermost edge, the light guide 314 makes physical contact with the covering 304. The line or plane of contact 320 between the light guide 314 and the upper interior surface of the covering 304 acts to interrupt the light guide 314 to allow the light to escape. Thus, the light guide 314 does not necessarily require any kind of micro-deformations 22, inclusions, or other physical modifications in order to allow light to escape.

Figure 10:
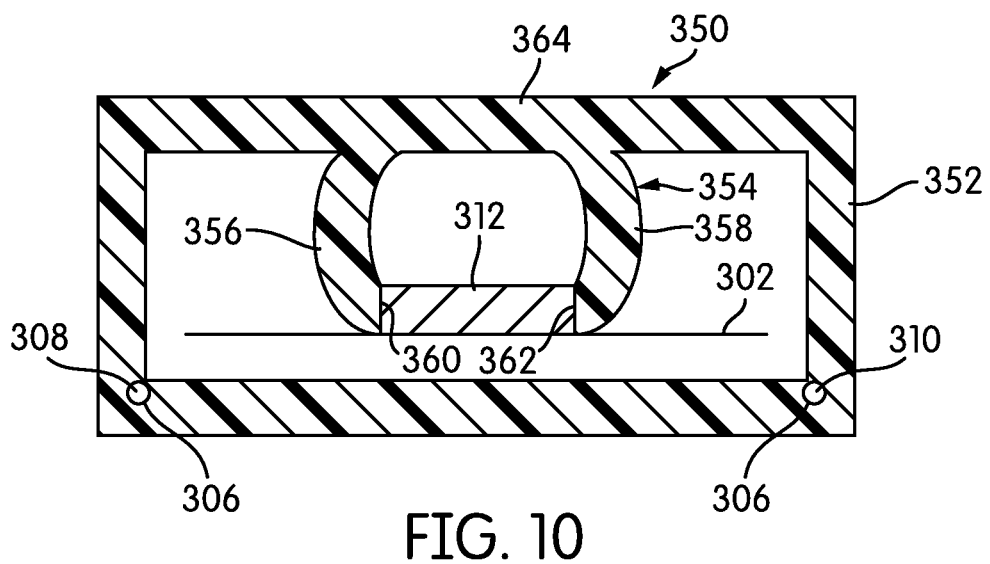
FIG. 10 is a cross-sectional view of a strip of high-voltage linear LED lighting with internal arcuate light-guide members.

FIG. 10 is a cross-sectional view similar to the view of FIG. 9, illustrating another embodiment of a high-voltage strip of linear lighting with a light guide, generally indicated at 350. The linear lighting 350 has many features in common with the linear lighting 300 of FIG. 9. In particular, the arrangement of the PCB 302, the LED light engines 312, and the power and ground leads 308, 310 within channels 306 in a covering 352 is the same or essentially the same as in the linear lighting 300.

In the linear lighting 350, the configuration of the light guide 354 is different than in previous embodiments. Instead of a cut-tubular light guide 314 that contacts or abuts the covering 304, the light guide 354 most closely resembles a tube that has been cut at top and bottom, leaving two arcuate light guide members 356, 358. The bottoms of these two members 356, 358 have ends 360, 362 that are immediately adjacent to the light-emitting portions of the light engines 312, such that the LED light engines 312 emit into the ends 360, 362, and thus, into the two light guide members 356, 358. As with other embodiments, the ends 360, 362 may be optically coupled to the light engines 312 by optical adhesives or other means in order to prevent or reduce light leakage, although that is not required in all embodiments.

Their arcuate, rounded shape allows the two light guide members 356, 358 to redirect and guide the light upward from the points at which it is emitted. However, because the two members 356, 358 are not fully tubular, the light is released into the upper portion 364 of the covering 352, from which point it is emitted.

Of course, the two members 356, 358 are shown as relatively thin. However, as those of skill in the art will appreciate, their outer surfaces in the direction in which the light is emitted act as the material/air interface and do the work of reflecting the light back into the members 356, 358. Thus, the two relatively thin members 356, 358 could be significantly broadened, so long as their outer surfaces remain curved. The result would be much like the light guide 106 of FIG. 4 with a rectilinear outer covering, although a broad, unitary light guide 106 may be broken into two pieces.

While much of the above description focuses on the use of side-emitting LED light engines as a means of lengthening the optical path, this does not mean that all LED light engines used in embodiments of the invention need be side-emitting, or packaged as side-emitting. For example, in some cases, a conventional top-emitting LED light engine may be used, and a portion of the PCB on which it is mounted may be folded or rotated to re-orient the LED light engine. Other manufacturing processes may allow the installation of a conventional top-emitting light engine at an angle on a PCB.

More generally, an interrupted or partial light guide, by its very nature, allows the designer to select the point or plane at which light is actually emitted. This allows a great deal of design freedom, and embodiments in which the LED light engines emit light in a direction, for example, 180° away from the point or plane where the linear lighting emits light are possible, as are embodiments in which the individual light engines are hidden from casual view. In those cases, only the light guide or guides would be visible.

Figure 11:
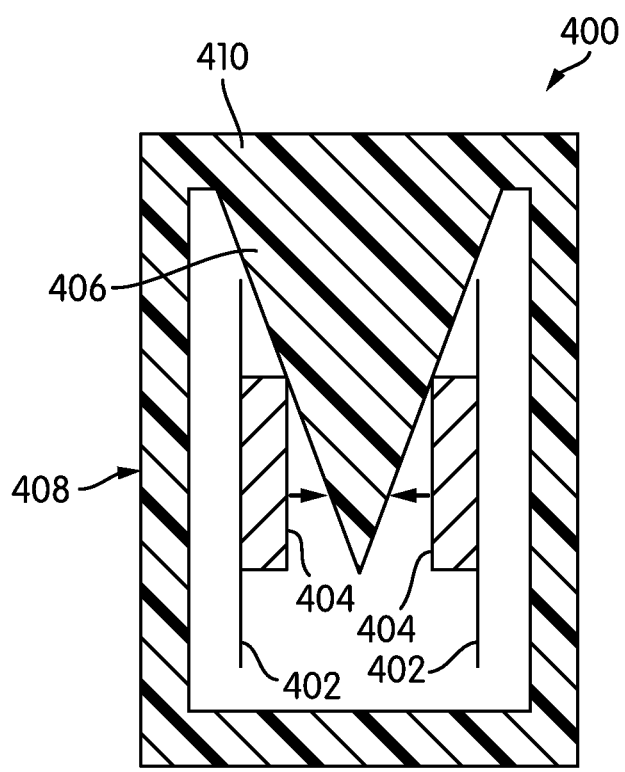
FIG. 11 is a cross-sectional view of a strip of linear LED lighting that uses two opposed PCBs with top-emitting LEDs and a prismatic light guide.

As one example, FIG. 11 is a cross-sectional view illustrating linear lighting, generally indicated at 400, that is one possible variation on the embodiments illustrated above. The linear lighting 400 has two PCBs 402, each with its own series of LED light engines 404. The two PCBs 402 extend vertically in the illustration of FIG. 10, such that their LED light engines 404, which in this case are standard, top-emitting LED light engines, face each other. The light engines 404 may each face a counterpart light engine 404 on the other PCB 402, or they may be staggered with respect to one another along the length of each PCB 402. Interposed between the two PCBs 402 such that the LED light engines 404 emit light into it is a prismatic light guide 406 similar to the prismatic light guides 158, 252 described above. Like the light guide 258 described above, the prismatic light guide 406 is an integral part of a covering 408 that encloses both PCBs 402; it depends from an upper face 410 of the covering 408. Like the light guide 258, the light guide 406 directs the light from the LED light engines 404 upward and releases it into the upper face 410 of the covering 408, from which the light is emitted. The covering 408 itself may be made of any suitable rigid or flexible material, depending on the nature of the PCBs 402 and whether the linear lighting 400 itself is intended to be rigid or flexible. In some embodiments, only the upper face 410 of the covering may be translucent; in those embodiments, the other faces or portions of the covering 408 may be opaque or reflective.

The linear lighting 400 could be either high-voltage or low-voltage; that is, in some embodiments, the covering 408 may include pockets or channels to carry power and ground conductors. In that case, the material of the covering 408 would be a suitable electrical insulator, in addition to its optical properties.

Figure 12:
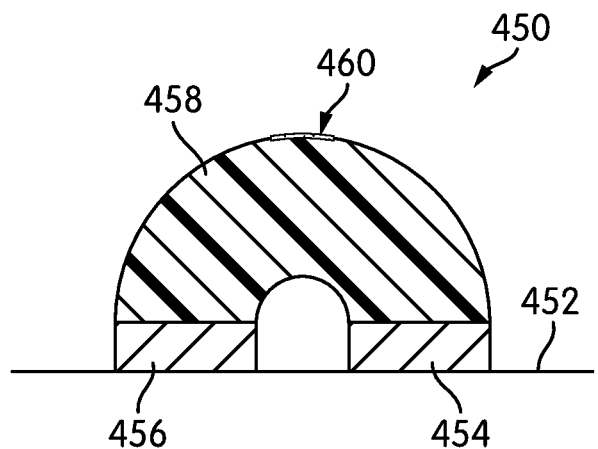
FIG. 12 is a cross-sectional view of a strip of linear LED lighting that uses two top-emitting LEDs with a light guide.

FIG. 12 is a cross-sectional view of a strip of linear lighting, generally indicated at 450, according to another embodiment of the invention. The linear lighting 450 has a PCB 452, on which are two series of top-emitting LED light engines 454, 456. The two series of LED light engines 454, 456 are spaced from each other laterally along the PCB 452 and may be either directly opposite one another or staggered, depending on the embodiment. Placed atop both series of LED light engines 454, 456 is a U-shaped light guide 458. The light guide 458 may be either flexible or rigid, typically to match whether the PCB 452 itself is flexible or rigid, and may be made of any of the materials described above. As with other embodiments, the light guide 458 may have microdeformations or inclusions 460 in order to release the light at a suitable position. In the illustrated embodiment, the microdeformations or inclusions 460 are centered at the top of the arc of the light guide 458, but could be in another position in a different embodiment.

Figure 13:
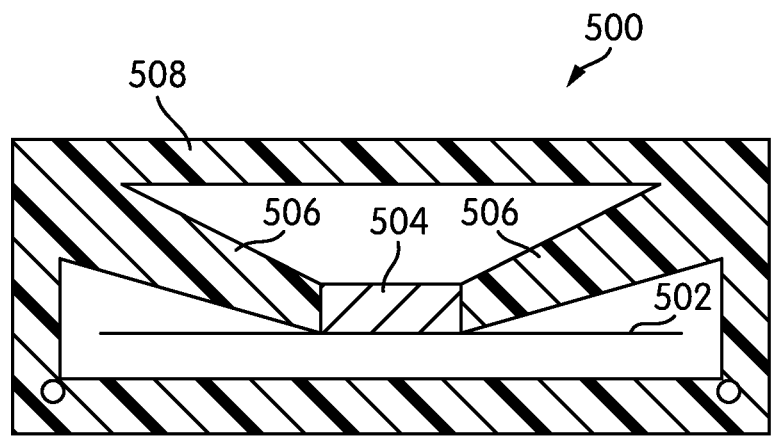
FIG. 13 is a cross-sectional view of a strip of linear LED lighting that uses side-emitting LEDs with a more rectilinear light guide.

FIG. 13 is a cross-sectional view of a strip of linear lighting, generally indicated at 500, according to another embodiment of the invention. The linear lighting 500 includes a PCB 502 on which a series of side-emitting LED light engines 504 are mounted. Immediately adjacent to the LED light engines 504 are two light-guide members 506. The light guide members 506 are angled with straight sides and are integral with and broaden into the outer covering 508 of the linear lighting 500. As with some of the other embodiments, the light guide members 506 may not completely contain the light emitted by the LED light engines 504. Rather, they are more likely to direct the light outward and upward and release it into the covering 508.

In many cases, a light guide alone may be sufficient to spread the light generated by LED light engines and produce a more uniform appearance, without "hot spots" caused by the individual light engines. However, in some applications, it may also be helpful to include diffusing features as well. For example, any of the fully enclosed linear lighting 250, 300, 350, 400, 500 may have its covering 254, 304, 352, 408, 508 surface-modified, sand-blasted, or further coated to add diffusing features, as disclosed in U.S. patent application Ser. No. 15/444,206, which was incorporated by reference above. Additionally, the upper surfaces of some light guides 106, 158, 202 may be similarly modified to include diffusing features.

Figure 14:
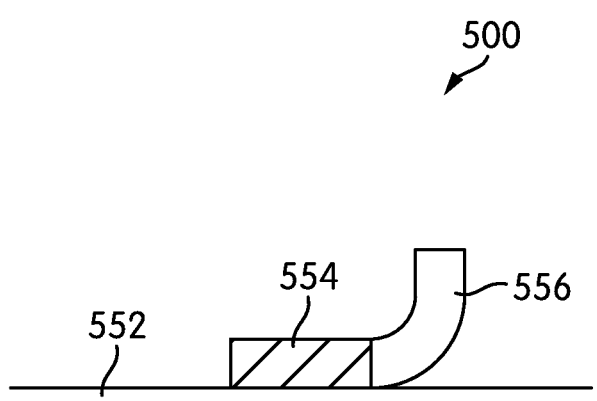
FIG. 14 is a cross-sectional view of a strip of linear LED lighting that includes a partial, directional light guide.

Much of the above description focuses on using a side-emitting LED light engine with a light guide to emit light upwardly. However, light guides may also be used in certain applications to redirect light in particular directions for special applications. For example, FIG. 14 is a cross-sectional view of a strip of LED linear lighting, generally indicated at 550. The linear lighting 550 has a PCB 552 with a series of LED light engines 554 mounted on the PCB 552. A J-shaped light guide 556 extends from a position adjacent to the LED light engines 554 upwardly. The light guide 556 may have microdeformations or other such features to release light. In the embodiment of FIG. 14, the light is directed outwardly, to the side.

While the invention has been described with respect to certain embodiments, the description is intended to be exemplary, rather than limiting. Modifications and changes may be made within the scope of the invention, which is defined by the appended claims.

What is claimed is:
1. Linear lighting, comprising:
 a printed circuit board (PCB);
 a series of side-emitting light-emitting diode (LED) light engines mounted on the PCB;
 a light guide mounted on the PCB, the light guide having
  a refractive index greater than that of air,
  at least one portion of the light guide proximate to light-emitting portions of the LED light engines and adapted to receive the light from the LED light engines, and
  a light-releasing surface positioned above the LED light engines and generally parallel with the PCB.
2. The linear lighting of claim 1, wherein the light guide has curved outer sidewalls.
3. The linear lighting of claim 2, wherein the curved outer sidewalls of the light guide terminate at a substantially flat upper surface that serves as the light-releasing surface.
4. The linear lighting of claim 1, wherein the light guide has the form of a split cylinder.
5. The linear lighting of claim 1, wherein the light guide has a refractive index of at least about 1.4.
6. Linear lighting, comprising:
 a printed circuit board (PCB);
 a first series of top-emitting light-emitting diode (LED) light engines mounted on the PCB;
 a second series of top-emitting LED light engines mounted on the PCB and spaced laterally from the first series of LED light engines;
 a light guide mounted atop the first series of LED light engines and the second series of LED light engines, the light guide having (a) a refractive index greater than that of air, (b) curved outer and inner sidewalls, and (c) a light-releasing surface defined along a portion of the outer sidewall.
7. The linear lighting of claim 6, wherein the light-releasing surface is on an upper portion of the outer sidewall.
8. Linear lighting, comprising:
 a printed circuit board (PCB);
 a series of side-emitting light-emitting diode (LED) light engines mounted on the PCB;
 a covering at least partially surrounding the PCB;
 a light guide integrated into the covering, the light guide having
  a refractive index greater than that of air,
  at least one portion of the light guide proximate to light-emitting portions of the LED light engines and adapted to receive the light from the LED light engines, and
  a light-releasing surface positioned above the LED light engines and generally parallel with the PCB.
9. The linear lighting of claim 8, wherein the light releasing surface of the light guide comprises an upper, outer surface of the covering.
10. The linear lighting of claim 8, wherein the covering fully surrounds the PCB and the LED light engines with a gap between the covering and the LED light engines.

11. The linear lighting of claim 10, wherein the light guide comprises a pair of angled, straight-sided members that extend from the upper interior of the covering to positions proximate to light-emitting portions of the LED light engines, the pair of angled, straight-sided members being adapted to receive the light from the LED light engines.

12. The linear lighting of claim 10, further comprising:
a second series of side-emitting LED light engines mounted on the PCB and spaced laterally from the series of LED light engines, the series of LED light engines and the second series of LED light engines being arranged to emit toward one another;
wherein the light guide comprises a generally triangular projection that depends from an upper interior portion of the covering, with a lower portion of the light guide positioned between the series of LED light engines and the second series of LED light engines to serve as the at least one portion of the light guide proximate to the light-emitting portions of the LED light engines.

13. The linear lighting of claim 10, wherein the light guide has a split-tubular shape and is within the covering.

\* \* \* \* \*